(12) United States Patent
Smith

(10) Patent No.: US 6,810,546 B1
(45) Date of Patent: Nov. 2, 2004

(54) INTERNAL COMBUSTION ENGINE WITH FIVE PORT HEAD CONFIGURATION

(76) Inventor: Alvin J. Smith, 4379 Modoc Rd., Santa Barbara, CA (US) 93111

( * ) Notice: Subject to any disclaimer, the term of this patent is extended or adjusted under 35 U.S.C. 154(b) by 0 days.

(21) Appl. No.: 10/640,799

(22) Filed: Aug. 15, 2003

(51) Int. Cl.[7] .................................................. F02B 3/00
(52) U.S. Cl. ......................................... 12/294; 123/299
(58) Field of Search ................................ 123/294, 299, 123/300, 301, 302

(56) References Cited

U.S. PATENT DOCUMENTS 4,140,088 A * 2/1979 de Vulpillieres ............ 123/478
4,240,381 A * 12/1980 Lowther ....................... 123/26
4,414,940 A * 11/1983 Loyd ........................... 123/299
5,115,776 A * 5/1992 Ohno et al. .................. 123/299
6,502,540 B1 1/2003 Smith

* cited by examiner

*Primary Examiner*—John T. Kwon
(74) *Attorney, Agent, or Firm*—William W. Haefliger

(57) ABSTRACT

Internal combustion engine apparatus, comprising a cylinder having a bore, a cylinder head, and a piston reciprocable in a bore toward and away from the head, two and only two air intake ports in the head, and two valves movable to control the ports, one and only one exhaust port in the head, and a third valve movable to control the exhaust port, and first and second fuel injection ports in the head, the first located generally between one air injector port and exhaust port, and the second located generally between the other air injector port and exhaust port.

29 Claims, 6 Drawing Sheets

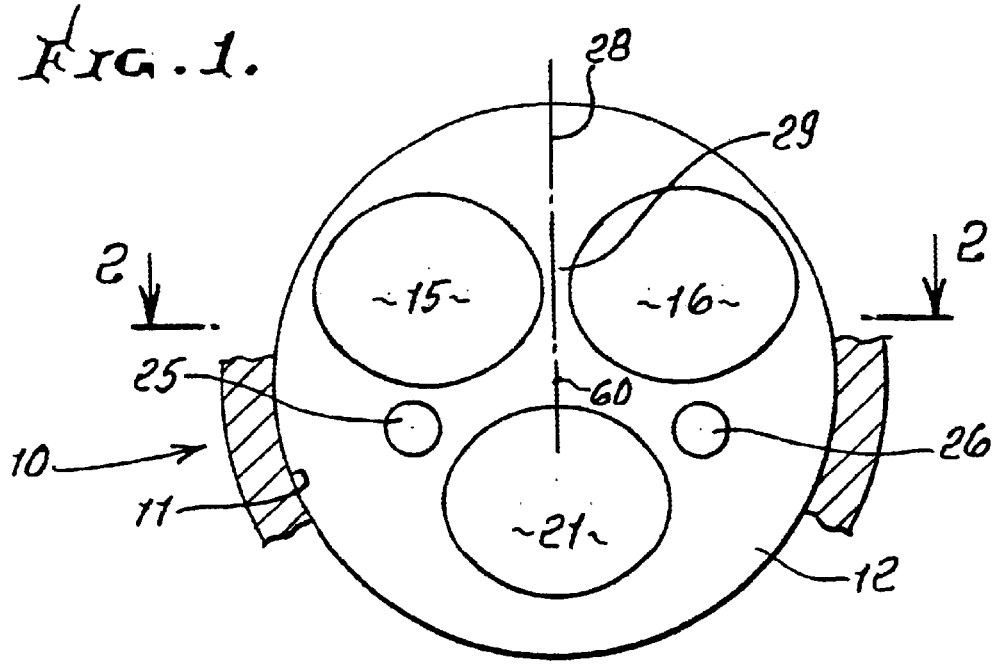
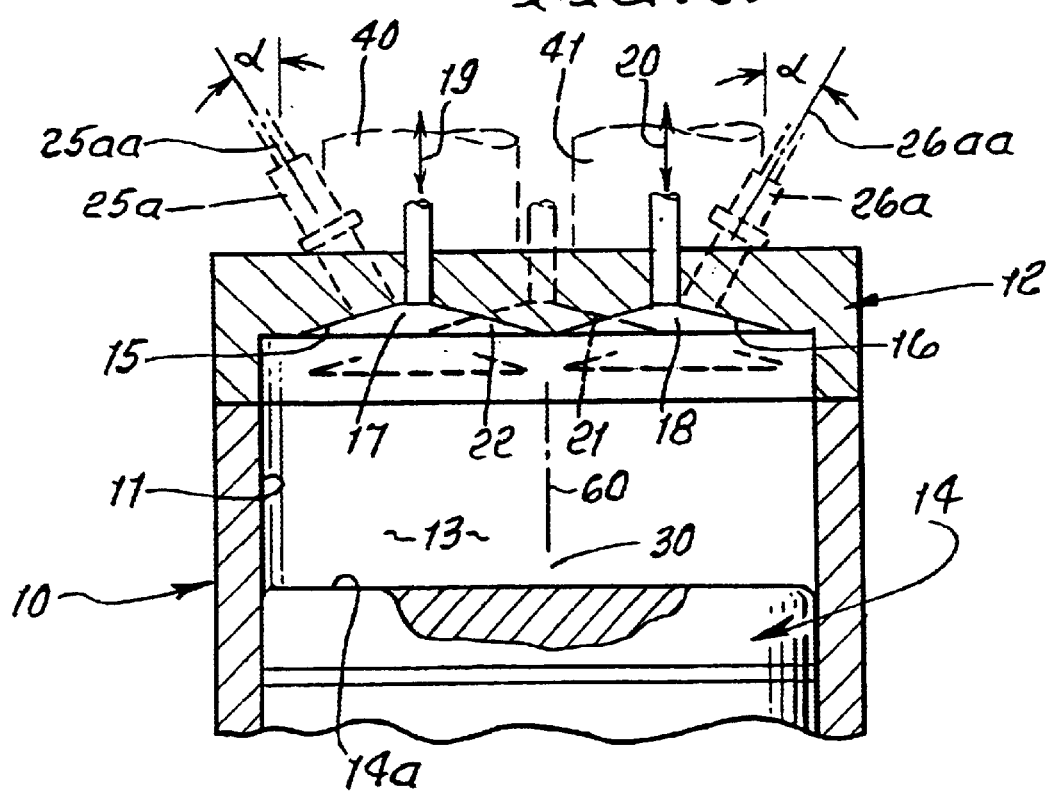

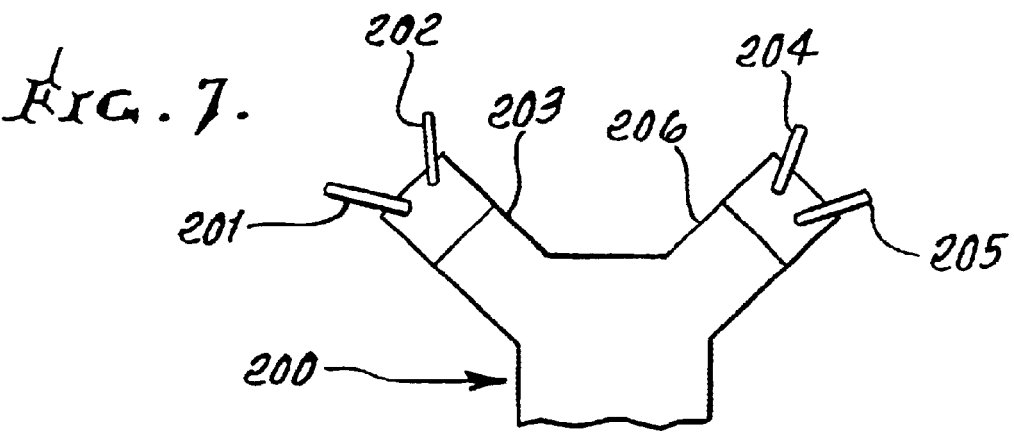
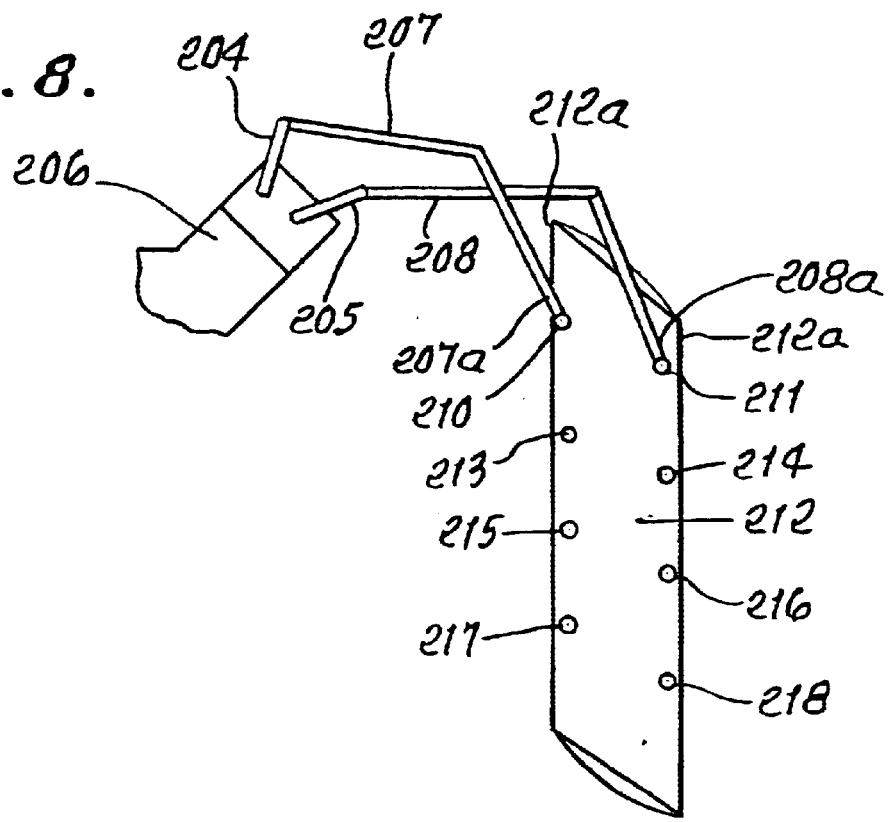

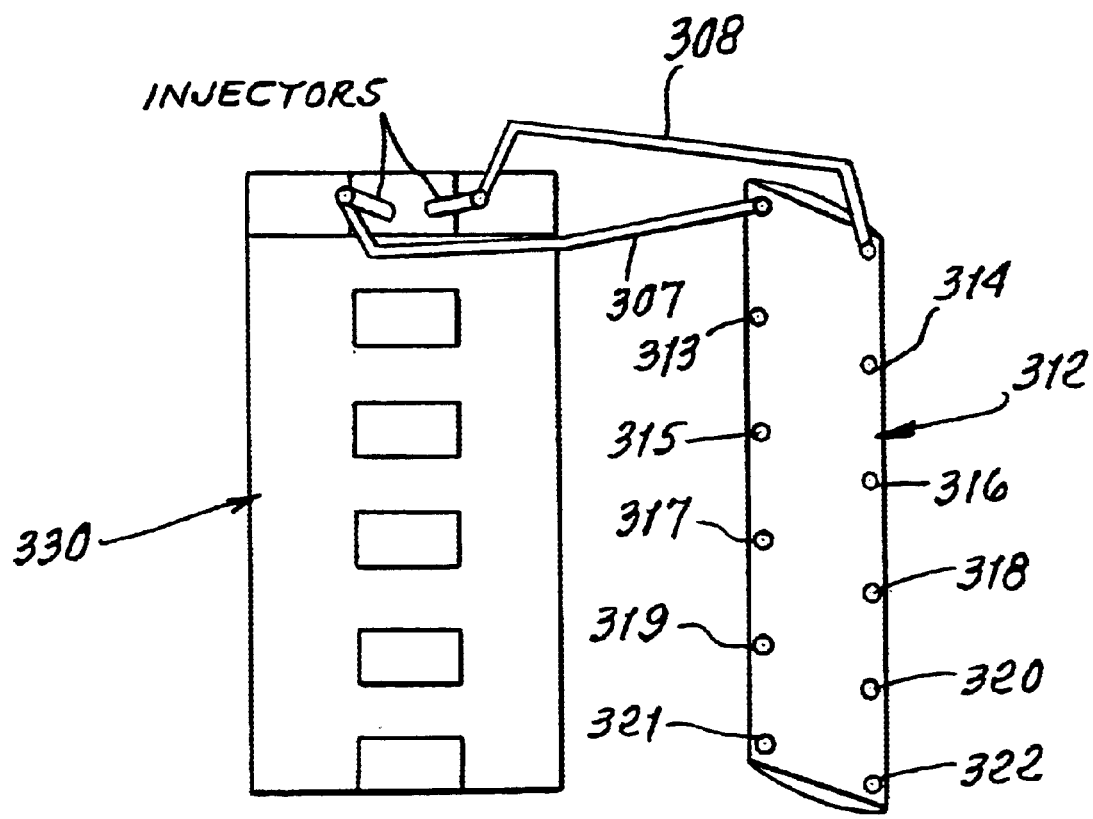

INTERNAL COMBUSTION ENGINE WITH FIVE PORT HEAD CONFIGURATION

BACKGROUND OF THE INVENTION

This invention relates generally to improvements in internal combustion engines, and more particularly to improvements in control of combustion gas flow into and in combustion chambers as well as control of injected fuel flow into combustion chambers, and exhaust flow from such chambers.

There is need for such improvements in combustible gas flow within combustion chambers, for example to obtain better efficiency, greater power output, and smoother running of engines and reduced emissions.

SUMMARY OF THE INVENTION

It is a major object of the invention to provide such improvements, as referred to.

Basically, the invention is embodied in an improved internal combustion engine that has multiple cylinders, each cylinder defining a cylinder wall, and having a cylinder head, there being a piston movable axially within each cylinder to define a combustion zone between the piston top and the cylinder head. In this combination, the invention provides:

a) two and only two air intake ports in the head, and two valves movable to control those ports, b) one and only one exhaust port in the head, and a third valve movable to control the exhaust port, c) and first and second fuel injector receiving ports in the head, the first located generally between one air intake port and the exhaust port, and the second located generally between the other air intake port and the exhaust port.

As will be seen, providing three valves (two air intake valves one exhaust valve) at each cylinder, and two fuel injectors at each cylinder, in the configuration as will be described, provides a number of unusual advantages. These include enablement in a diesel engine, of a leaner air/fuel mixture, retarded fuel injection to result in more heat supply to the converter which lowers emissions; more rapid heating of the converter up to operating temperature; more efficient clean-up of emissions in the combustion chamber; injected fuel reduced travel distance within the cylinder due to use of two injectors and their positioning in relation to the air intake valves and the one exhaust valve; lessened engine noise production; and increased engine produced acceleration.

With twin fuel injectors, the fuel is injected so that the burning fuel zones will meet at the center of the bore and meet at the back walls forcing the compressed air to mix with the burning fuel. Fuel injection can be controllably retarded to gain horsepower and acceleration, and also reducing emissions under heavy load.

With two injectors, the distance the burning fuel travels is about 75 percent less than with a single injector. This enables retarding of injection timing and allows more fuel to be added. This in turn produces more torque and horsepower along with a much cleaner running engine, at a lower RPM.

Insofar as the structure of the engine is concerned, it is a further object to provide an exhaust valve location approximately equally spaced from the two air intake ports, the diameters of the two air intake ports and of the exhaust port each exceeding one-half the radius of the cylinder bore.

Typically, the two fuel injector ports are located at opposite sides of an axial radial plane bisecting a space formed between the two air intake ports. That plane may typically also bisect the exhaust port; and the two fuel injector ports may be equally spaced from and at opposite sides of that plane.

Another object includes provision of air intake ducts extending in generally parallel relation toward the two air intake ports, and an exhaust duct extending away from the exhaust port, as well as away from said air intake ducts.

A yet further object includes provision of a cylinder head having a parabolic inner re-entrant surface intersecting all of the five described ports; the piston may likewise have a parabolic re-entrant upper surface facing the head parabolic inner surfaces, whereby the flowing combustible mixture is directed generally axially in the combustion zone by both the head and piston for rapid impact and improved mixing of air and fuel mixture components.

An additional object is to provide a pressurized fuel container, and substantially equal length fuel supply lines extending from said container to said injectors. As will be seen, such dual equal length pressurized fuel line's may be provided to the injectors at each cylinder, and the cylinders may be arranged in one or two rows, with the container or containers extending parallel to such rows. If two containers or "rails" are provided, pressure equalization lines maybe extended between the fuel containers, as in a looping system.

These and other objects and advantages of the invention, as well as the details of an illustrative embodiment, will be more fully understood from the following specification and drawings, in which:

DRAWING DESCRIPTION

FIG. 1 is a plan view looking axially toward the five ports as they intersect the interior surface of the cylinder head;

FIG. 2 is a section taken on lines 2—2 of FIG. 1, and vertically and axially through the cylinder and piston, with valves in position;

FIGS. 7–10 are schematic views showing fuel delivery to pairs of injectors, low pressure return fuel lines not being shown.

DETAILED DESCRIPTION

Figure 3:
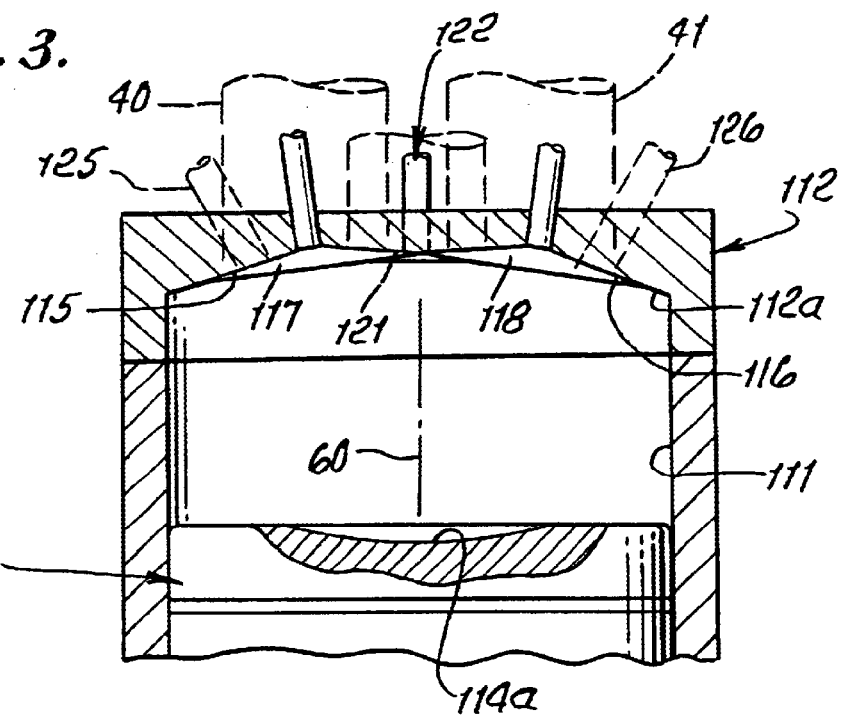
FIG. 3 is a view like FIG. 2, but showing provision of parabolic re-entrant recesses in the head and piston.

Referring first to FIGS. 1 and 2, showing a preferred embodiment, an engine such as a Diesel has multiple cylinders, each cylinder 10 having a bore 11; a cylinder head 12 extending transversely across one end of the combustion zone 13 in the cylinder; and a piston 14 axially reciprocable in the cylinder bore.

Two and only two air intake ports 15 and 16 are located in the head, and two valves 17 and 18 move in directions 19 and 20 to open and close the ports. Such valve movement may be coincident to provide for simultaneous air flows into the combustion zone, and simultaneous blocking of such air flows, as in a four-stroke cycle.

One and only one exhaust port 21 is provided in the head, and a third valve 22 is movable to control that port, as in a four-stroke cycle. Such timing includes air inlet valves open and exhaust valve closed during a piston down stroke; air inlet valves and exhaust valve closed during a piston up-stroke to compress the air received into the cylinder bore; air intake valves closed and exhaust valve closed during a subsequent power stroke; and air intake valves closed and exhaust valve open during a subsequent exhaust stroke.

First and second fuel injection ports are provided in the head, the first located generally between one air injector port and said exhaust port, and the second located generally between the other air injector port and said exhaust port.

The fuel injection ports are seen at 25 and 26 in FIG. 1. Typically the exhaust port 21 is approximately equally spaced from said two respective air intake ports, and from the two ports 25 and 26.

Also, the two fuel injector ports are at opposite sides of an axial radial plane bisecting a space formed between said two air intake ports. That plane appears at 28 and the narrow space formed between the two air intake ports is indicated at 29. In the example, which is preferred, the plane 28 bisects, or approximately bisects, exhaust port 21. Also in the example, the diameter of each of said two intake ports and said exhaust port exceeds ½ the radius of said bore. Ports 25 and 26 are equally, or substantially equally, spaced from plane 28 and are located at opposite sides thereof. Fuel injectors associated with ports 25 and 26 are shown at 25a and 26a in FIG. 2. In that view, the fuel injector axes 25aa and 26aa are inclined at angles α toward a mixing zone or zones 30 in the combustion chamber enabling optimum or near optimum mixing of air with fuel as the piston moves upwardly to compress the mixture to a point that ignition occurs just before the piston top 14a reaches top dead center position.

Fuel injection via the two injectors is preferably directed toward spaced apart or different portions of the combustion zone, as the piston top rises toward the head, so that two air-fuel mixing zones are initially created, each receiving one-half or about one-half of the injected fuel. The axes of the two fuel injectors are skewed. Fuel injection is typically initiated at a time when the piston top, in terms of crank angle, is about 22° from top dead center. Quieter engine operation is achieved since each injector injects only about one-half the amount of fuel that would be injected by one injector only.

Figure 6:
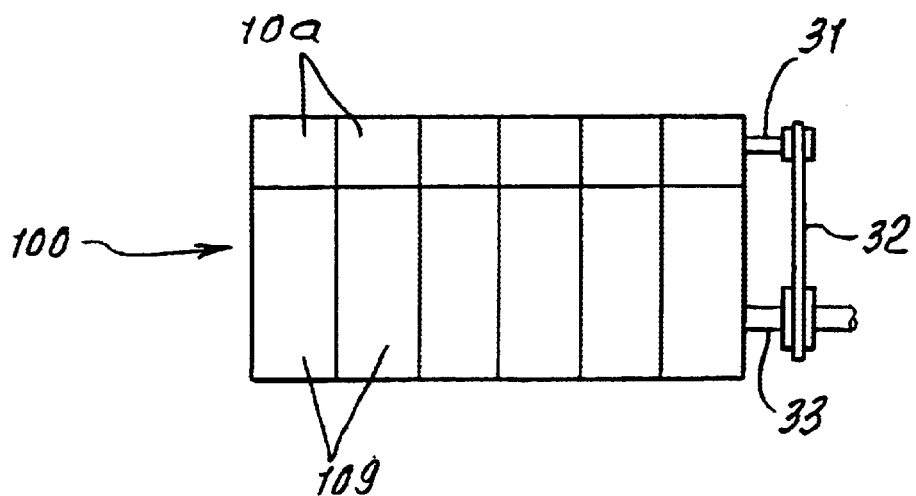
FIG. 6 is an engine schematic.

FIG. 6 schematically shows engine 100 with multiple cylinders 109 as referred to. Rotary cams to open and close the valves are schematically indicated at 10a; and a cam shaft 31 is rotatably driven at 32, by the engine crankshaft 33.

FIG. 3 is similar to FIG. 2, except that the modified head 112 has a parabolic re-entrant inner surface 112a intersected by all five ports (air intake ports 115 and 116; exhaust port 121; and fuel injection ports 12S and 126) corresponding respectively to ports 15, 16, 21, 25 and 26 in FIGS. 1 and 2. The axis of the parabolic surface 112a is seen at 60. Also, the piston 114 has or may have a parabolic re-entrant upper surface at 114a, with an axis the same as axis 60. Surfaces 112a and 114a face one another, and surface 114a sub-tends all five ports. Parabolic surface 114a causes gaseous pressure waves, received as during combustion to travel back upwardly with increased axial direction, i.e. the waves travel with increased straightening, to achieve better mixing and burning of the air and fuel. Parabolic surface 112a reflects upwardly traveling pressure waves back downwardly, toward parabolic surface 114a, and with increased straightening, to also achieve better mixing and burning of the air and fuel. Straightening of gaseous pressure wave flows in direction of axis 60, reduces wave bouncing off cylinder bore 111, reducing engine noise. The position interrelationships and functions of the five ports 115, 116, 121, 125 and 126 are the same or substantially the same as the position interrelationships of ports 15, 16, 21, 25 and 26; excepting that the faces of the valves 117, 118, and 122, when closed, are flush or substantially flush with the parabolic surface 112a.

Figure 4:
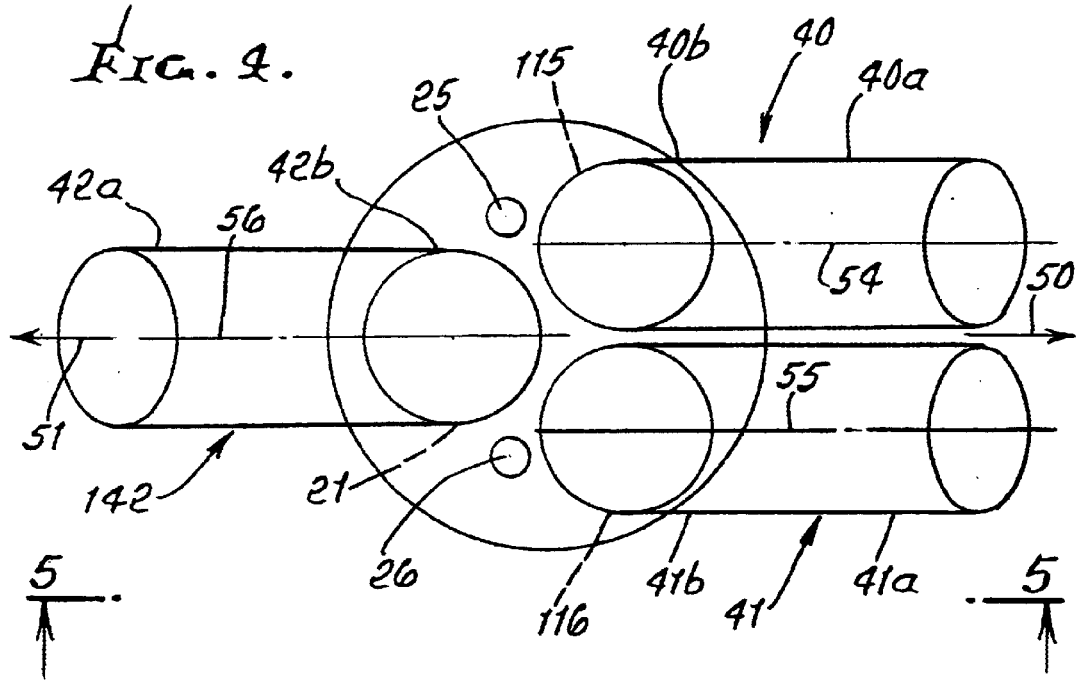
FIG. 4 is a top plan view showing air supply ducts and an exhaust duct, in relation to the fuel injectors.

FIG. 4 shows the provision of two air intake ducts 40 and 41 extending in generally parallel relation at 40a and 41a, and turning at 40b and 41b, toward the two air intake ports 115 and 116, and an exhaust gas duct 142 extending at 42b away from the exhaust port 121. Ducts 40 and 41 extend in parallel or generally parallel relation in direction 50 in FIG. 4, while duct 142 extends in direction 51, away from ducts 40 and 41. The ducts and their axes define three parallel, or near parallel, planes 54, 55, and 56, plane 56 located between planes 54 and 55. All three planes 54, 55, and 56 extend in the space between the two fuel injection ports 125 and 126, and parallel to the axis 60 of bore 11.

Figure 5:
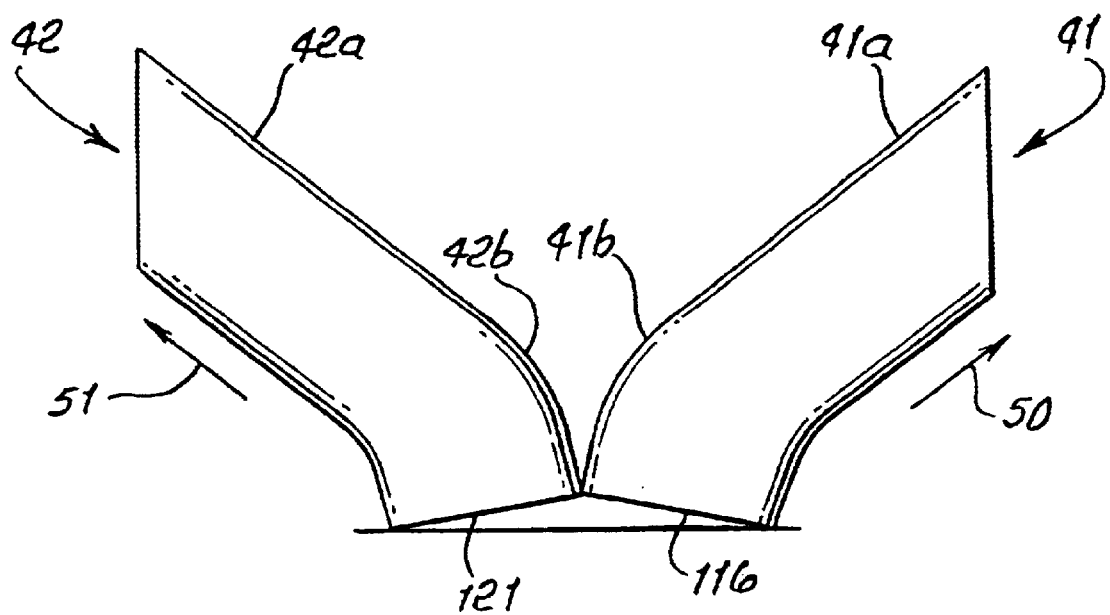
FIG. 5 is a view taken on lines 5—5 of FIG. 4.

FIG. 5 shows the turning relationships of duct segments 41a and 41b, and 42a and 42b.

FIG. 7 is a schematic showing of a V-shaped engine block 200, with divergent fuel injectors 201 and 202 associated with cylinder 203; and divergent fuel injectors 204 and 205 associated with cylinder 206. In FIG. 8, pressurized fuel is supplied via two lines 207 and 208 to injectors 204 and 205. Those lines are of equal or substantially equal length, and have their inlet ends 207a and 208a connected to outlet ports 210 and 211 at a pressurized fuel source, such as a container or "rail" 212. End 212a of 212 is relatively close to fuel injectors 204 and 205, so that lines 207 and 208 are relatively short. Outlet ports pairs 213 and 214, 215 and 216, and 217 and 218 are spaced along the length of the container for connection with additional lines extending to injectors at additional engine cylinders. Accordingly, such additional lines are also of the same lengths as lines 207 and 208.

FIG. 9 is like FIG. 8, except that the engine 330 is a six cylinder engine, with equal length lines 307 and 308 corresponding to lines 207 and 208. Similar lines connect the pressurized fuel container 312 outlet port pairs 313 and 314, 315 and 316, 317 and 318, 319 and 320, and 321 and 322, to the fuel injectors at the six cylinders. All lines are of the same length, and fuel pressure at the outlet ports is the same.

Figure 10:
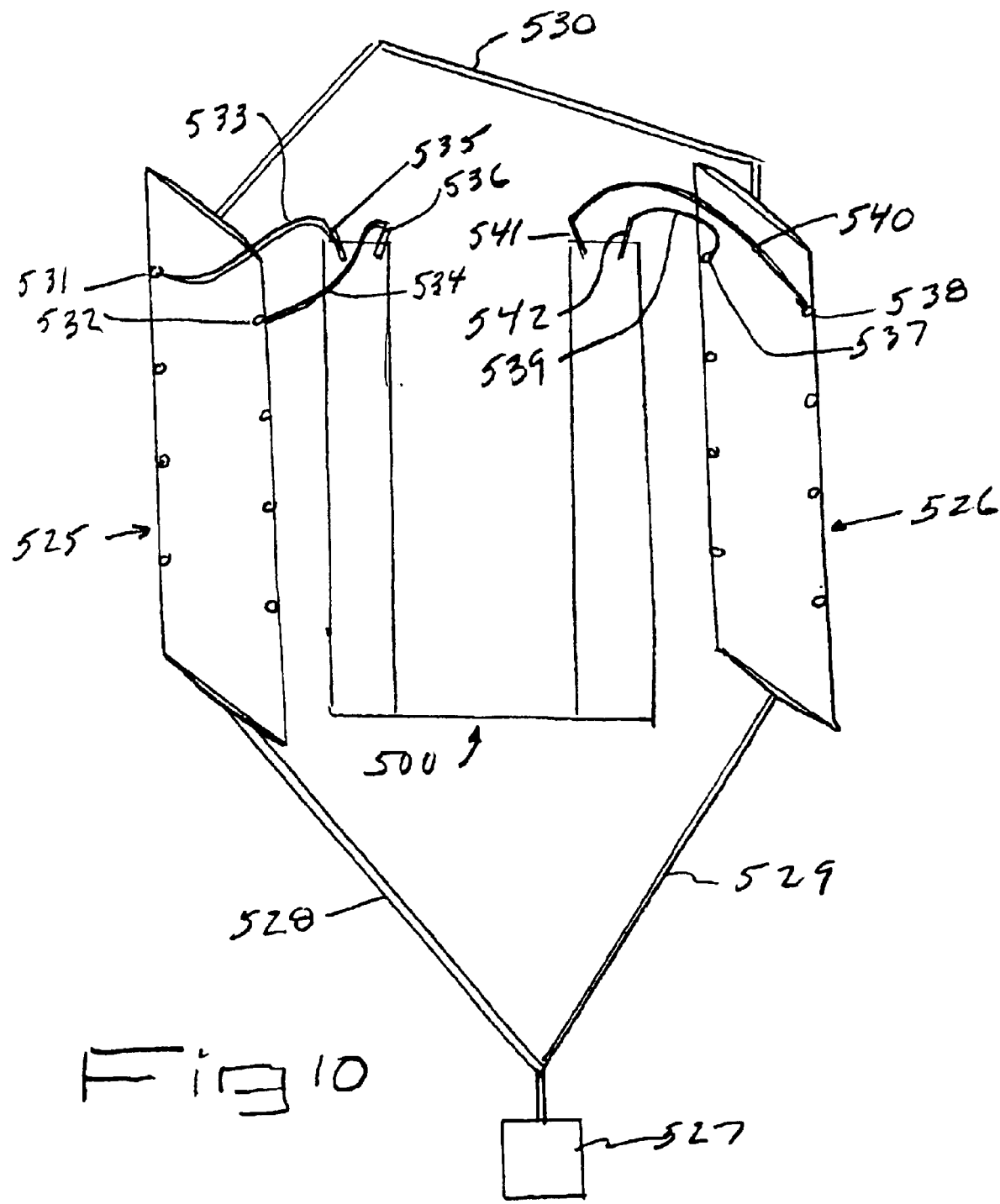

FIG. 10 shows a "looping" fuel injection pressure equalization system, associated with a V-8 engine indicated at 500. The system includes two containers or rails 525 and 526. The latter are supplied with pressurized fuel from pump 527, via lines 528 and 529. The opposite ends of the containers are connected by fuel line 530. Fuel pressure pairs of outlet ports from the containers are connected by equal length lines with injectors at the cylinders. See for example representative ports 531 and 532 from 525; lines 533 and 534; and injectors 535 and 536. See also outlet ports 537 and 538 from 526; lines 539 and 540; and injectors 541 and 542.

The disclosure of U.S. Pat. No. 6,502,540B1 is incorporated herein by reference.

I claim:

1. Diesel combustion engine apparatus, comprising, in combination
   a) a cylinder having a bore, a cylinder head, and a piston reciprocable in said bore toward and away from the head,
   b) two and only two air intake ports in the head, and two valves movable to control said ports, c) one and only one exhaust port in the head, and a third valve movable to control said exhaust port, d) and first and second fuel injection ports in the head, the first located generally between one air intake port and said exhaust port, and the second located generally between the other air intake port and said exhaust port.

2. The combination of claim 1 wherein said exhaust port is approximately equally spaced from said two respective air intake ports.

3. The combination of claim 1 wherein the diameter of each of said two intake ports and said exhaust port exceeds ½ the radius of said bore.

4. The combination of claim 1 wherein said head has a parabolic inner surface intersected by all of said ports.

5. The combination of claim 4 wherein the piston has parabolic upper surface facing said head parabolic inner surface.

6. The combination of claim 1 wherein the two fuel injector ports are at opposite sides of an axial radial plane bisecting a space formed between said two air intake ports.

7. The combination of claim 6 wherein said plane bisects said exhaust port.

8. The combination of claim 6 wherein said two fuel injector receiving ports are equally spaced from said plane and at opposite sides thereof.

9. The combination of claim 1 including fuel injectors associated with said fuel injector ports, the fuel injectors defining skewed axes.

10. The combination of claim 1 including air intake ducts extending in generally parallel relation toward said two air intake ports, and an exhaust duct extending away from said exhaust port, and away from said air intake ducts, said ducts defining three generally parallel planes, two fuel injectors associated with said fuel injector ports, said three planes extending between said two fuel injection ports.

11. An internal combustion engine, comprising in combination:

a) structure including a cylinder and head defining a combustion chamber, and a piston reciprocable in said chamber, the chamber having an axis, and four chamber quadrants spaced about said axis, b) two air inlet ports in said structure and respectively associated with clockwise successive first and second of said quadrants, and an exhaust port in said structure and overlapping clockwise successive third and fourth of said quadrants, c) two fuel injector ports in said structure, one of which is associated with a junction between the second and third quadrants, and the other of which is associated with a junction between the first and fourth of said quadrants, d) all of said ports communicating with the interior of said combustion chamber, e) said engine being a Diesel engine.

12. The combination of claim 11 wherein said two air inlet ports are respectively located at opposite sides of an axial radial plane containing said chamber axis and bisecting said exhaust port.

13. The combination of claim 12 wherein said two fuel injector ports are respectively located at opposite sides of said plane.

14. The combination of claim 11 wherein said structure includes a head defining a re-entrant parabolic surface facing said combustion chamber interior.

15. The combination of claim 14 wherein said piston defines a re-entrant parabolic surface facing said combustion chamber interior.

16. The combination of claim 15 wherein said surfaces face one another.

17. The combination of claim 11 including reciprocating valves controlling said air inlet ports and said exhaust port.

18. The combination of claim 14 wherein said air inlet ports and said exhaust port intersect a re-entrant parabolic interior surface defined by the head.

19. The combination of claim 18 wherein all of said ports are clustered to face the interior of a zone defined by said piston re-entrant parabolic surface.

20. The combination of claim 4 wherein all three valves have sides facing a combustion zone in the cylinder, said sides being flush or substantially flush with said head inner parabolic surface when the valves are closed.

21. The combination of claim 9 including a pressurized fuel container, and substantially equal length fuel supply lines extending from said container to said injectors.

22. The combination of claim 1 including multiple cylinders associated with the head as defined in a) of claim 1 and multiple ports associated with each cylinder as defined in b), c), and d) of claim 1, there being e) two fuel injectors associated with the fuel injector ports at each cylinder, f) a pressurized fuel container or containers, g) and substantially equal length fuel supply lines extending from the container or containers to the respective fuel injectors associated with each cylinder.

23. The combination of claim 22 wherein the cylinders extend in a row, the container or containers extending substantially parallel to that row, and having, for the two injectors associated with each cylinder, two fuel outlets to deliver fuel to said two substantially equal lines, respectively.

24. The combination of claim 23 wherein there is one container, and six of said cylinders extending in a row.

25. The combination of claim 23 wherein the cylinders extend in two parallel rows and there are two of said containers extending generally parallel to the two rows respectively.

26. The combination of claim 25 wherein there are three cylinders in each row.

27. The combination of claim 25 wherein there are four cylinders in each row.

28. The combination of claim 25 including at least one pressure equalization line extending between the two containers.

29. The combination of claim 28 wherein the two containers and said pressurization equilization line or lines form a loop connected system.

* * * * *